United States Patent [19]

Karlsson

[11] 4,226,384

[45] Oct. 7, 1980

[54] FISHING REELS WITH A LEVEL-WIND MECHANISM

[75] Inventor: Jarding U. Karlsson, Svängsta, Sweden

[73] Assignee: ABU Aktiebolag, Sweden

[21] Appl. No.: 68,798

[22] Filed: Aug. 22, 1979

[51] Int. Cl.³ .................... A01K 89/04; A01K 89/015
[52] U.S. Cl. .................................. 242/84.42; 242/212
[58] Field of Search ................. 242/84.42, 84.41, 212, 242/213, 214, 215, 218, 158.3

[56] References Cited

U.S. PATENT DOCUMENTS

| | | | |
|---|---|---|---|
| 1,345,072 | 6/1920 | Case | 242/84.42 |
| 1,836,755 | 12/1931 | Hirsch | 242/213 |
| 2,639,870 | 5/1953 | Graham | 242/84.42 |
| 2,859,924 | 11/1958 | Sarah | 242/213 |

Primary Examiner—Billy S. Taylor
Attorney, Agent, or Firm—Karl W. Flocks

[57] ABSTRACT

The disclosure relates to a fishing reel of the type which has a rotary line spool and a level-wind mechanism with a rotary involute screw and a line-laying device, driven by the involute screw for reciprocating movement therealong, and which has a drive means comprising the crank of the reel and a transmission, by means of which the line spool and the involute screw are rotatable in a first direction for retrieval of the fishing line onto the spool during even distribution of the line by means of the level-wind mechanism. The characterizing feature of the invention is that the transmission is provided with a device which is disposed to be actuated by rotation of the line spool in a direction opposite to the line-retrieval direction, such as when the line spool is rotated by the fishing line, in order, after an actuation time-lag which is determined with respect to the movement of the line-laying device, to lock the involute screw against rotational movement as soon as the line-laying device arrives at a central position on the involute screw, and to release the line spool from the involute screw.

8 Claims, 7 Drawing Figures

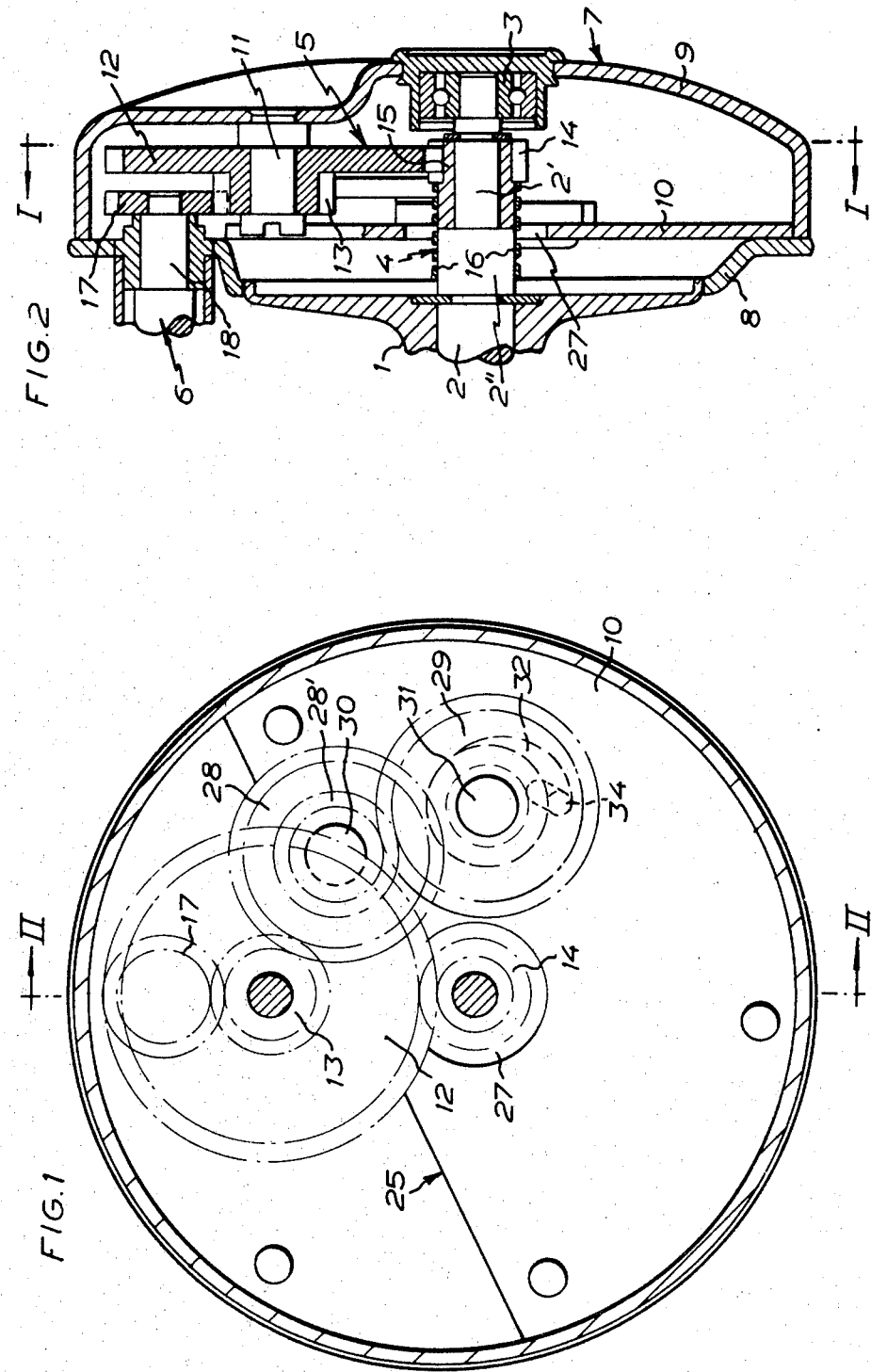

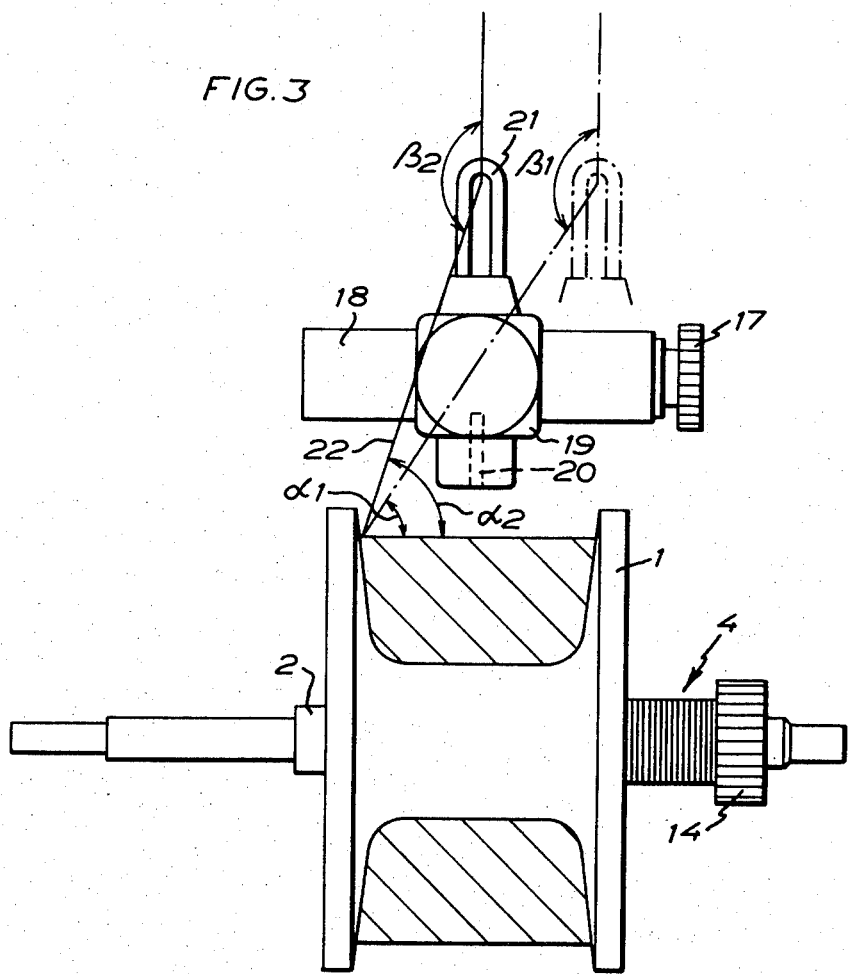

FISHING REELS WITH A LEVEL-WIND MECHANISM

The present invention relates to improvements in a fishing reel having a line spool and a rotatable involute screw with a level-wind device, the line spool and the involute screw being interconnected by means of an apparatus, driven by the crank of the reel, for rotating the line spool in one direction and operating the level-wind mechanism for winding up the fishing line during distribution of the line on the spool, and an apparatus for release of the spool from both the crank and the involute screw during a cast.

Fishing reels with a level-wind mechanism for the criss-cross laying of the fishing line on a line spool which is rotated by means of the crank of the reel for winding up the line onto the spool, and in which the line rotates the spool when the line is drawn out as during a cast or when a fish has taken the bait and runs, are normally provided with a manually releasable clutch between the line spool and a gear wheel transmission connected to the crank. In a cast when the clutch is released, the line spool may rotate without the crank and the transmission between the crank and the spool rotating. In most fishing reels of this type, the level-wind mechanism is arranged to be driven by the crank by the intermediary of a separate transmission which is normally disposed between the line spool and the level-wind mechanism so that it is driven by the line spool. It is less common that this latter transmission and the level-wind mechanism can be released from the line spool in connection with a cast, although this is desirable in order to reduce the number of parts which move during a cast, most preferably reducing the number of such parts to the line spool alone. However, apparatuses have been proposed in this art which permit the release of the line spool also from the level-wind mechanism during a cast, but the disadvantage in such an apparatus is that the level-wind mechanism may, during a cast, stop with the line-laying device (normally a metal loop through which the line runs) in one end position with respect to the line spool. As a result, each time the line runs out from the line spool, the line angle at the opposite end of the spool will be maximally unfavourable with respect to the longitudinal axis of the spool and maximally unfavourable at the point of deviation where the line runs through the line-laying device.

Attempts have been made to overcome this problem by equipping the fishing reels both with an apparatus for release of the level-wind mechanism and its transmission from the line spool, and with an apparatus which, during a cast, automatically releases the line from the line-laying device, but prior art constructions for releasing the line during a cast are complicated and often unreliable in function and, moreover, require considerable modification of the conventional level-wind mechanism, which renders such fishing reels extremely complicated and expensive.

The object of the present invention is to realize a simple, functionally reliable apparatus which, during a cast, automatically stops the level-wind mechanism with the line-laying device in a central position with respect to the involute screw of the level-wind mechanism and thereby with respect to the line spool, as a result of which the unfavourable line angles during paying-out of the line are greatly reduced.

A further object of the present invention is to realize an apparatus of the above-disclosed type in the form of a compact unit which easily may be incorporated into the majority of fishing reels of the contemplated type with inconsiderable or no modification of the rest of the fishing reel. A particular object is to construct the apparatus according to the invention as a unit which may easily be mounted as accessory equipment in the transmission between the line spool and the level-wind mechanism of a reel.

To this end, the apparatus according to the invention is characterized by a non-reverse device which cooperates with a gear wheel transmission disposed for operating the involute screw and which comprises a device which is rotatable by means of the transmission at a speed of rotation which is determined with respect to the rotation of the involute screw, a fixed device and, therebetween, a movably disposed locking device and guide means cooperating therewith which, on rotation of the spool in the line retrieval direction, holds the locking device in the released position with respect to the rotatable device but is operative, on commencement of rotation of the spool and the transmission in the opposite direction (reverse direction) when the line spool is rotated by the line, to transfer the locking device from the released position to a locking position between the rotatable device and the fixed device in a movement which is coordinated with respect to the rotation of the involute screw and the movement of the line-laying device, such that the locking device reaches the locking position and thereby arrests the rotatable device whereby this latter arrests the transmission and the involute screw, as soon as the line-laying device has reached a central position with respect to the involute screw on rotation of the line spool in the reverse direction.

The nature of the present invention will be more readily understood from the following brief description of the accompanying drawings, and discussion relating thereto.

In the accompanying drawings:

FIG. 1 shows a fishing reel according to the invention in cross-section taken along the line I—I in FIG. 2;

FIG. 2 shows one end portion of the fishing reel in axial section taken along the section II—II in FIG. 1;

FIG. 3 is a schematic view of a level-wind mechanism;

Figure 4:
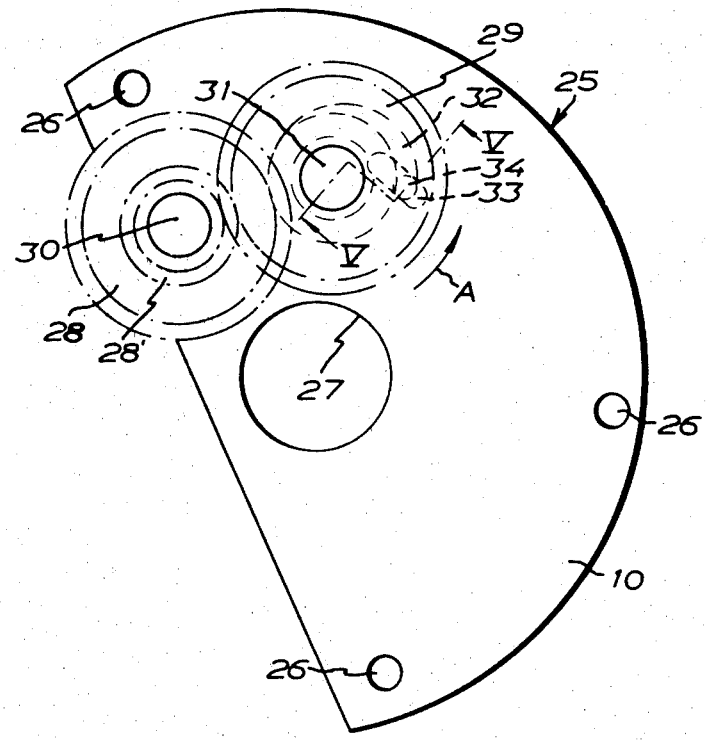
FIG. 4 is a plan view of a plate, dismantled from the fishing reel of FIGS. 1 and 2 and having three gear wheels and an automatic non-reverse device for cooperation with the level-wind mechanism of the fishing reel.

In fishing reels of the multiplier type, which are embraced by the present invention, the line spool of the fishing reel is driven by a crank by the intermediary of a gear wheel transmission and a manually operable release apparatus (not shown) which, in fishing reels for right-handed people, are placed in a housing on the right-hand end of the fishing reel. FIGS. 1 and 2 show the opposite, i.e. normally the left-hand end portion of such a fishing reel in two sections at right angles to each other. The fishing reel comprises a line spool 1 rotatable by means of the crank (not shown), with a shaft 2 which is rotatably journaled in the opposite end portions of the fishing reel by means of bearings, of which the one end bearing is shown at 3 in FIG. 2. The shaft 2 is disposed to drive, by the intermediary of a one-way clutch 4 and a gear wheel transmission 5, a level-wind mechanism 6 when the line spool 1 is rotated by means of the crank. In the illustrated embodiment, the gear wheel transmission 5 is built into a housing 7 which consists of an annular wall 8 connected to the frame (not shown) of the fishing reel, and an outer casing 9 connected to the wall by means of screws (not shown). A plate 10 is mounted in the housing 7, the object of the plate being described in a later section of this description. A free-running shaft 11 is connected to the casing 9 and extends into the housing 7 and on which is rotatably journaled a gear wheel unit which consists of two coaxial, integral gear wheels 12, 13 of which the one gear wheel 12 is of much greater radius than the other gear wheel 13.

The major gear wheel 12 engages with a gear wheel 14 which is coaxial with the shaft 2 of the line spool 1 and, on rotation of the line spool 1 by means of the crank, is driven by the shaft 2 of the line spool by the intermediary of the one-way clutch 4. In the illustrated embodiment, the one-way clutch 4 consists of a sleeve 15 rotatably journaled on a tapered end portion 2' of the shaft 2, the gear wheel 14 being connected to the sleeve. The sleeve 15 has the same outer diameter as a portion 2" of the shaft 2 located between the sleeve and the line spool 1. A helical clutch spring 16 is disposed on an adjacent portion of the sleeve 15. On rotation of the line spool 1 in one direction, driven by means of the crank, the clutch spring 16 is placed under tension and forms a fixed clutch between the shaft 2 and the sleeve 15, whereby the gear wheel 14 is rotated and drives the other portion of the transmission 5, i.e. the gear wheel 12 and the gear wheel 13, as well as a gear wheel 17 by the intermediary of the gear wheel 13, the gear wheel 17 engaging with the gear wheel 13 and being fixedly disposed on the end of an involute screw 18 for operating this involute screw which forms part of the level-wind mechanism 6.

A level-wind mechanism of conventional type may be used as the level-wind mechanism 6 in this invention. One example of a conventional level-wind mechanism is schematically illustrated in FIG. 3 and comprises, apart from the above-mentioned involute screw 18, a carriage 19 which, on rotation of the involute screw, is reciprocally moved in the longitudinal direction of the involute screw, in that the carriage engages with the involute thread of the screw by means of an engagement member 20. The carriage 19 supports a loop 21 through which the fishing line 22 extends from the line spool 1. When the line spool is rotated by means of the crank, the line is wound up on the line spool and, in that the carriage 19 with the loop 21 is thereby moved reciprocally along the involute screw 18, the line is laid evenly on the line spool 1.

In conventional fishing reels which have a manually operable release apparatus between the crank and the line spool but lack an automatic release apparatus in the transmission between the crank and the level-wind mechanism, such as the above-described one-way clutch 4 between the spool 1 and the level-wind mechanism 6, the level-wind mechanism is always driven when the spool is rotated, i.e. both when the line is retrieved on the spool 1 and when it is paid out from the spool during a cast. However, in the construction illustrated in FIGS. 1 and 2, the line spool 1 is released manually from the crank and the transmission between the crank and the spool; and automatically from the transmission 5 between the line spool and the level-wind mechanism. This is effected in that the clutch 4, when the spool 1 shows a tendency to rotate in the pay-out direction of the line, automatically releases the gear wheel 14 and the sleeve 15 from the shaft 2 of the line spool. This automatic release is realized in the illustrated embodiment in that the clutch spring 16, on rotation of the line spool 1 in a direction opposite to the line-retrieval direction, tends to be twisted in a direction which opens the spring 16, the spring thereby releasing its engagement with the shaft 2 and/or with the sleeve 15 which is thereby released from the shaft 2.

Instead of the described one-way clutch 4, use can be made of some other suitable clutch, for example a centrifugal clutch which automatically releases the line spool 1 from the level-wind mechanism 6 during a cast.

In conventional fishing reels in which the line spool 1 also drives the level-wind mechanism 6 during a cast, the impetus of the cast is arrested by the friction between the movable parts of the level-wind mechanism 6 and the transmission 5, which necessitates the use of relatively heavy baits and shortens the casting length. However, by providing, between the line spool 1 and the transmission 5, a clutch such as the clutch 4 which automatically releases the line spool from the transmission 5 and the level-wind mechanism during a cast, it is possible to avoid this problem. Nevertheless, there remains one other problem, as will be apparent from the following discussion.

A disadvantage inherent in a level-wind mechanism which is stationary during a cast in that the carriage 19 with the loop 21 (or a corresponding line layer) could, during the cast, just as well be located at either of its extreme outer positions as at any position between. If the carriage and the loop are located at one end position, the resistance against paying-out of the line 22 from the line spool varies gently during the cast (and also when a fish pulls out the line as it runs), the resistance being least when the line is drawn out from the line spool at that end of the line spool in register with the carriage 19; and most when the line is drawn out from the opposite end of the line spool to the position of the carriage. This is because the pay-out angle $\alpha$ of the line from the line spool to the loop 21 and the angle of deviation $\beta$ in the loop 21 are unfavourable. If the carriage 19 is in a central position, the variation of the resistance against paying-out of the line will be considerably lower. The ideal situation would be if the line could, during a cast, be released from the line-laying device or loop 21, so that the line always runs out at a right angle to the line spool. Many constructions have been proposed in the art for releasing the line from the line-laying device during a cast, but all possess disadvantages, such as being unreliable or complicated and rendering fishing reels equipped with such devices considerably expensive.

Consequently, the present invention calls instead for an apparatus of a particularly simple and functionally reliable type which automatically arrests the line-laying device of the level-wind mechanism, i.e. the carriage 19 and the line-laying device 21, in a central position in the initial phase of a cast. This apparatus according to the invention, which will be described in greater detail below, is specially constructed in order to be readily mounted in fishing reels of the above-described type and is, in the illustrated embodiment, in the form of a unit which is generally designated 25 and is shown in its entirety in FIG. 4 dismantled from the fishing reel, details of the apparatus being also shown in FIGS. 5–7.

The unit 25 consists of the already described plate 10 which, in the illustrated embodiment, is provided with screw holes 26 for mounting between the casing 9 and the annular, fixed frame wall 8 and, for example, for connection by means of the same screws as those which are used for connecting the casing 9 to the annular wall 8. The plate 10 has a central opening 27 for allowing the passage of the shaft 2 of the line spool and the level-wind 6 in the mounted position of the plate 10. The plate 10 is planar and has partly circular form. The plate 10 may most simply be described as a circular plate with a sufficiently large cut-away portion in order to enable it to be free, in the mounted position shown in FIGS. 1 and 2, from the gear wheels 13 and 17. The plate 10 supports three gear wheels, 28, 28' and 29 which consist, for example, of acetate plastics and are rotatably mounted on shafts 30, 31 which are mounted free-running on the plate 10, like the shaft 30 in FIG. 4. The two gear wheels designated 28 and 28' are coaxial and are of different diameters as well as preferably being integral. The minor gear wheel 28' engages with the third gear wheel 29 for operation of the latter. The major gear wheel 28 integral with the minor gear wheel 28' overlaps the gear wheel 29 and engages, in the mounted position of the unit 25 in the fishing reel, with the gear wheel 13 which drives the gear wheel 17. When the transmission 5 is driven by the line spool 1 on its rotation by means of the crank, the three gear wheels 28, 28' and 29 are also driven without thereby having any effect on the function of the fishing reel.

However, the unit 25 also includes a non-reverse clutch, which permits rotation of the gear wheels in one direction and, with a certain time-lag, arrests rotation in the opposite direction. This non-reverse clutch consists, in the illustrated, preferred embodiment, of a groove 32, which comprises a circle-forming portion 32' and a helice-forming portion 32" connected thereto in that side of the wheel 29 which is turned to face the plate 10, and a relatively short, straight or arcuate groove 33 in a surface portion of the plate 10 located in register with the gear wheel 29, and, finally, a clutch ball 34 located in the groove.

Figure 5:
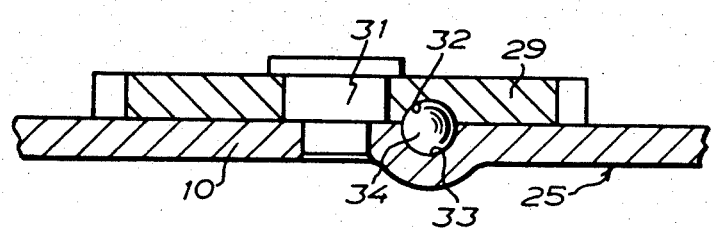
FIG. 5 is a fragmentary cross-section taken along the line V—V in FIG. 4.
Figure 6:
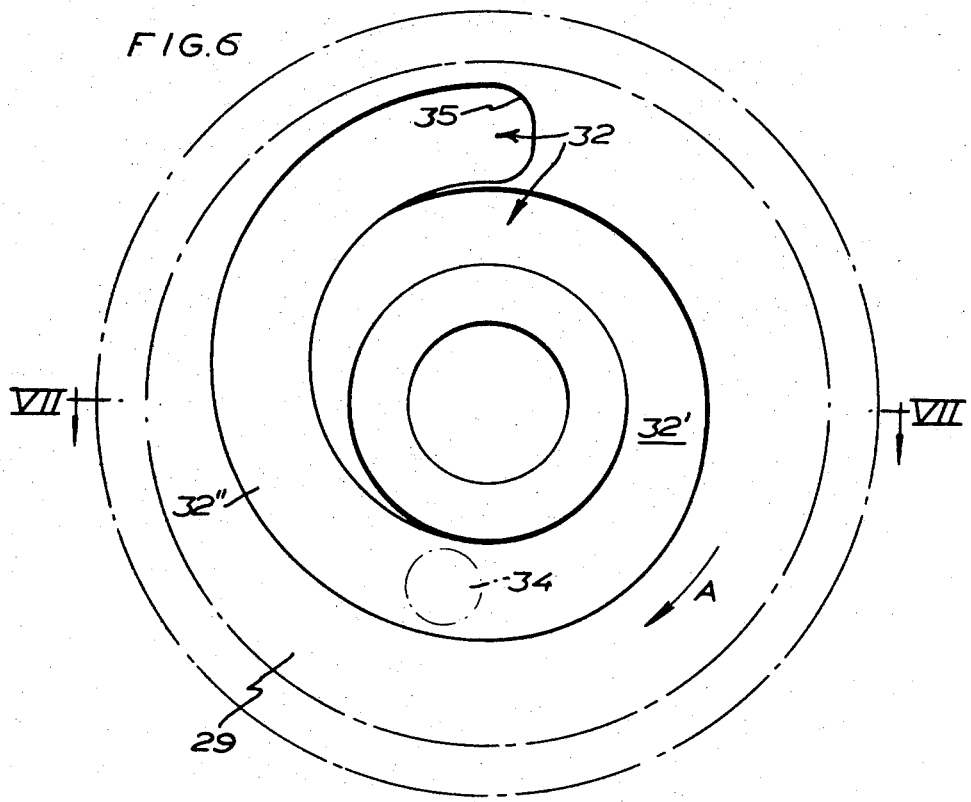
FIG. 6 is a plan view of that side of the gear wheel in FIG. 5 turned to face the plate.
Figure 7:
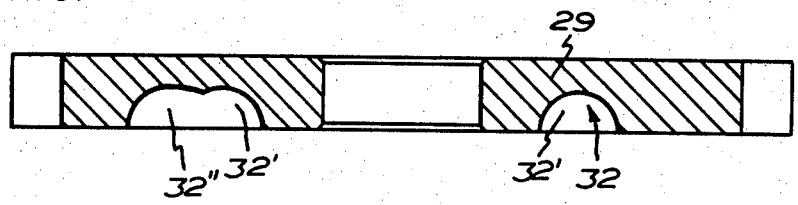
FIG. 7 is a cross-section taken along the line VII—VII in FIG. 6.

When the line spool 1 is driven by means of the crank of the fishing reel, i.e. in a direction for retrieving the line on the spool, the gear wheel 29 (driven by the gear wheels 28, 28') freely rotates in a corresponding direction, i.e. the direction indicated by means of a solid arrow at A in FIG. 4. On any tendency to rotation of the gear wheel 29 in this direction, the ball 34 is, namely, guided by the groove 33 in the plate 10 in an inward direction towards the centre of the gear wheel 29 in the groove 32 in the gear wheel 29 and is caused to follow the circle-forming portion 32' of the groove 32. On rotation of the gear wheel 29 in the opposite direction, such as when the line spool 1 and the transmission 5 are driven by the line in the initial phase of a cast, the ball 34 is, on the other hand, guided by the groove 33 in the plate 10 in a direction away from the centre of the gear wheel 29, whereby the ball 34 is caused to follow the groove 32 in a direction towards its helice-forming portion 32", which terminates in an abutment edge at 35 in FIG. 6. When the ball 34 reaches the end of the helice-forming groove portion 32' in the gear wheel 29, the ball is stopped and forms an arrest member between the gear wheel 29 and the plate 10. Consequently, the gear wheels 28, 28' are arrested and thereby also the transmission 5 and the level-wind mechanism 6. The length and angle of the groove 32 in the plate 10 are adapted for movement of the ball 34 between the central, annular portion 32' of the groove 32 and the end 35 of the helice-forming portion 32" of the groove 32, which portion, as is shown in FIG. 6, commences and terminates at substantially two diametrically located points on the gear wheel 29. Aided by the knowledge of the length of the involute screw 18 and the pitch of the involute thread and by the knowledge of the gear ratio for the transmission 5 and the gear wheels 28, 28', 29, it is easy to select such a length of the helical groove portion 32" that the level-wind mechanism will be arrested with the carriage 19 in a central position with respect to the involute screw 18.

In the preceding section of the description, it was stated that the line spool 1, when it is rotated by the line during a cast, does not drive the transmission 5 and the level-wind mechanism. This is correct, but by a certain, minor initial friction between the clutch spring 16 on the shaft 2 and the clutch sleeve 15, the clutch 4 may, at the beginning of a cast (i.e. before the spool has had time to reach high speed of rotation) transmit a minor but sufficient force to drive the transmission 5 and, thereby, the level-wind mechanism 6, but the non-reverse apparatus 32–35, which permits rotation of the gear wheel 29 in one direction, will, after a short time-lag, arrest the gear wheel 29 and thereby the transmission 5 when rotation occurs in the opposite direction. By a suitable design of the helical portion 32" of the groove 32 in view of the above-disclosed factors (the length etc. of the involute screw) and after presetting of the carriage 19 in a central position when the ball 34 is located at the end 35 of the helical groove 32", it will be ensured that the carriage 19 is always arrested in its central position each time the ball 34 reaches the end of the groove 35 and thereby arrests the gear wheel 29. During a cast, the gear wheel 29 is arrested after a maximum of 1½ revolutions, which corresponds, at most, to a movement of the carriage 19 from the central position to one end position and back to the central position. This maximum travel also corresponds to such a short pay-out distance of the line 22 that the carriage 19 is stopped in its central position before the fishing rod has, during the cast, imparted full power to the cast and before the line with the bait has reached full speed. When this occurs, and during the continued paying-out of the line 22, the line spool 1 is released from the transmission 5, and the carriage 19 remains in its central position, whereby the line is drawn out from the line spool with relatively slight resistance in that the maximum line angles between the line and the spool are considerably more favourable than if the carriage 19 were to be at an end position on the spool during the cast.

Instead of using the separate gear wheels 28, 28', 29 for cooperation with the time-lag-acting non-reverse apparatus 32–35, it could be possible to use but the gear wheel 29 in direct engagement with, for example, the gear wheel 14 in the transmission 5. It is also theoretically conceivable to dispose the groove 32 in any given gear wheel in the transmission 5, for example in the outer side of the gear wheel 12, and provide the groove 33 in some suitable fixed portion. However, this may necessitate a change of the gear ratio of the transmission 5 for operation of the involute screw 18, which is rendered unnecessary when the unit 25 is used. The unit 25 may always readily be provided with gear wheels which fit different types and sizes of fishing reels, and may readily be adapted for assembly by a suitable selection of size and shape of the carrier plate 10. If desired, it is easy to remove the unit 25 and the fishing reel may then be used in a normal manner.

To exemplify the compact design of the unit 25 and the non-reverse apparatus 32-35, it might be mentioned that the plate 10 may have a thickness of 0.6 mm and the gear wheel 29 a thickness of 1.9 mm in a diameter of the ball 34 of 2 mm. For the ball 34, use is made of a steel ball with a hardness of 56-58 Rc. The gear wheels 28, 28', 29 are, as was mentioned above, manufactured of acetate plastics. The groove 33 in the plate 10 (which may consist of metal or plastics) was designed as a depression (please see FIG. 5) with a corresponding bight on the opposite side of the plate 10. The groove 32 in the gear wheel 29 was provided by milling. The groove 32 had rounded side edges seen in cross-section, and a maximum depth and minimum groove width of 1 mm plus approx. 0.1 mm for obtaining sufficient play for the ball 34 (which had a diameter of 2 mm) at a depth of 1 mm of the groove 33. The ratio between the gear wheels 13-28-28'-29 was selected in order to give the gear wheel 29 relatively low speed, which facilitates adjustment for arresting the gear wheel 29 in exactly the correct position when the level-wind carriage 19 is located precisely in the centre of the involute screw 18. In the above-described example, $\frac{3}{4}$ of a revolution of the gear wheel 29 corresponds to one travel of the carriage 19 along half the length of the involute screw 18. The shape of the groove 32 with its groove portions 32' and 32" is apparent from FIGS. 6 and 7 in the example under discussion, but it might be mentioned that the circular groove portion 32' had a central diameter of 4.5 mm. The groove 33 had a width of 2.5 mm, a depth of 1 mm, rounded side edges and spherical ends, and a length of approximately 5.5. mm. The longitudinal axis of the groove 33 made an angle of 40° with respect to a radius from the centre of the plate 10 (the longitudinal axis of the shaft 2) through the centre of the gear wheel 29.

However, the above-disclosed dimensions should merely be seen as examples and may be varied in dependence upon the above and other factors, such as the available space in the housing 7.

It should also be noted that the one-way clutch 4 may be replaced by a clutch of other design for automatic release of the transmission 5, on condition that it satisfies the requirements of the above-described function. One example of an alternative clutch is a centrifugal clutch which, during a cast, releases the transmission after a certain time-lag, i.e. not until the rotation of the spool has reached sufficient speed for release by centrifugal force, whereafter the non-reverse clutch arrests the transmission by inertia forces and thereby acts in the manner which was described above.

What I claim and desire to secure by Letters Patent is:

1. A fishing reel having a frame, a rotatable line spool and a level-wind mechanism which comprises a rotatable involute screw and a movable line-laying member geared to said involute screw and reciprocal in a linear movement parallel to the axis of the line spool by rotation of said involute screw, and drive means comprising a hand crank and a transmission means for rotating said line spool in a first direction for the retrieval of the fishing reel on the line spool, said line spool being rotatable in a second, opposite direction, driven by the fishing line, such as during a cast, said transmission means comprising disengageable clutch means and gear means connected between said line spool and said involute screw for rotating the latter, to distribute the fishing line on the line spool when said line spool is rotated in said first direction during the retrieval of the fishing line, delayed operation arresting means having a rotatable first member connected and disposed for rotation by said gear means, a second member fixed in relation to the frame of the reel, and a delayed-action arresting third member which is movable between a first position and a second, arresting position, and which, in said first position, permits rotation of said first member for permitting rotation of said involute screw in said first direction by said line spool by the intermediary of said gear means, whereas said third member in said second, arresting position, arrests said rotatable first member thereby locking said gear means and said involute screw against rotation, said third member, by rotation of said first member when rotation thereof in said second direction is initiated by said line spool, being movable from said first to said second, arresting position in such timed relationship with the rotational movement of said involute screw and the linear movement of said line-laying device that said delayed-action arresting third member arrives at said second, arresting position subtantially as soon as said line-laying device arrives at a central position in relation to said involute screw, whereby said level-wind mechanism is, during each casing operation, arrested with said line-laying device positioned substantially in said central position, said disengageable clutch connected between said line spool and gear means having disconnecting means for disconnecting said line spool from said gear means when the former is rotated in said second direction and the latter is arrested by said delayed-action arresting means.

2. The fishing reel as recited in claim 1, wherein said first member of said delayed-action arresting means is connected to and disposed to be rotated by said gear means at a selected ratio with respect to the rotation of said involute screw, said first and second members having means forming a guide therebetween, and said movable third member being disposed between said first and second members and movably guided by said guide means, said guide means including an endless first guide path for receiving said third member and permitting movement thereof in said endless path for permitting rotational movement of said first member in relation to said second member and thereby for permitting transmission of rotational movement from said line spool to said involute screw by the intermediary of said gear means in said first direction, and a second guide path aving a first end in communication with said endless first guide path and formed to receive said movable third member when said rotatable first member is rotated by said line spool through said gear means in said second direction, said second guide path having a second end which, together with said fixed second member, defines an end arrest means for arresting said movable third member, said endless first guide path and said second guide path being dimensioned with respect to said selected ratio of rotational movement between said first clutch member and said involute screw such that said movable third member, when rotation of said line spool in said second direction is initiated, is directed to move into said second guide path and to arrive at said arrest at the same moment as said line-laying device arrives at a substantially central position along said involute screw, said third member, on arrival at an end position in contact with said end arrest means, being clamped between said rotatable first and fixed second members and thereby preventing further rotation of said rotatable first member, said gear means and said involute screw in said second direction, such that said level-wind mechanism will, on each casting operation, be arrested with said line-laying device in said central postion.

3. The fishing reel as recited in claim 2, wherein said rotatable first member is a gear wheel, said third movable member is a roller, such as a ball, and wherein said guide means comprises guide groove means in one side of the gear wheel, said roller being mounted to roll along and be guided by said groove means, said groove being of lesser depth than the diameter of said roller and comprising, as said first guide path, an annular groove which is coaxial with respect to the axis of rotation at said gear wheel, and a curved, finite groove having a radial inner end in communication with said annular groove, departing therefrom and terminating at an abutment end, and an auxiliary guide means supported by said fixed second member and formed such that, on rotation of the gear wheel in a direction which corresponds to the direction of rotation on retrieval of the line on the line spool, i.e. said first direction, it guides the roller and retains the latter in said annular groove, and, on rotation of the gear wheel in the opposite direction which corresponds to said second direction, guides and retains said roller in said finite groove, and wherein said auxiliary guide means cooperate with said finite groove and said roller to lock the gear wheel against further rotation in said second direction when said roller reaches the end of said finite groove.

4. The fishing reel as recited in claim 3, wherein said auxiliary guide means is in the form of a recess in said fixed second member and is formed to permit rolling movement of said roller between said first and said second positions, thereby to permit movement of said roller from said annular groove to an end position in said curved, finite groove and back to said annular groove.

5. The fishing reel as recited in claim 4, wherein said guide means and auxiliary guide means are formed constantly to maintain said roller in rolling contact with said first member, substantially without slippage.

6. The fishing reel as recited in claim 3, wherein said gear wheel is a first gear wheel rotatably mounted on a plate which forms said fixed second member, having said auxiliary guide means and maintaining said roller enclosed therebetween, and wherein said plate further supports a second gear wheel driven by said gear means between said line spool and involute screw, and geared to drive said first gear wheel at reduced speed, and wherein said plate with said auxiliary guide means and said first and second gear wheels is arranged and mounted as a dismountable unit in the fishing reel, independent of the transmission.

7. The fishing reel as recited in claim 1, wherein said gear means is a first, separate, secondary transmission between said line spool and involute screw, and wherein said transmission further comprises a primary, separate transmission between said hand crank and said line spool, the line spool being connected to the crank by the intermediary of a clutch which is manually releasable for a cast, said secondary transmission including a one-way clutch which is automatically released during a cast in order thereby to permit rotation of the spool independently of both the crank and the involute screw, said one-way clutch being disposed, on rotation of the line spool at low speed by means of a line, to drive the secondary transmission and to be completely released therefrom when the secondary transmission is arrested by means of said non-reverse apparatus and said delayed-action arresting means.

8. The fishing reel as recited in claim 7, wherein said one-way clutch is disposed to be released from said secondary transmission between said line spool and said level-wind mechanism first when said line spool driven by the fishing line exceeds a predetermined speed.

* * * * *